(12) United States Patent
Hughes et al.

(10) Patent No.: US 7,095,030 B2
(45) Date of Patent: Aug. 22, 2006

(54) INVESTIGATIONS OF RADIOACTIVITY

(75) Inventors: Karl Anthony Hughes, Seascale (GB); John Lightfoot, Seascale (GB)

(73) Assignee: British Nuclear Fuels plc, Risley (GB)

(*) Notice: Subject to any disclaimer, the term of this patent is extended or adjusted under 35 U.S.C. 154(b) by 436 days.

(21) Appl. No.: 10/307,228

(22) Filed: Nov. 27, 2002

(65) Prior Publication Data

US 2003/0164455 A1 Sep. 4, 2003

(30) Foreign Application Priority Data

Nov. 27, 2001 (GB) ............................................. 0128354
Dec. 7, 2001 (GB) ............................................. 0129264

(51) Int. Cl.
*G01T 1/16* (2006.01)

(52) U.S. Cl. .................. 250/395; 250/336.1; 250/338.1

(58) Field of Classification Search .............. 250/338.1, 250/336.1, 395
See application file for complete search history.

(56) References Cited

U.S. PATENT DOCUMENTS

| | | | |
|---|---|---|---|
| 3,270,205 A | 8/1966 | Ladd et al. |
| 4,187,908 A | 2/1980 | Fertl et al. |
| 4,424,446 A | 1/1984 | Inbar |
| 4,562,353 A | 12/1985 | Del Medico |
| 4,692,624 A | 9/1987 | Ichihara |
| 4,827,132 A | 5/1989 | Moscovitch |
| 5,204,533 A | 4/1993 | Simonet |
| 5,286,973 A | 2/1994 | Westrom et al. |
| 5,479,017 A | 12/1995 | Yamada et al. |
| 5,936,240 A | 8/1999 | Dudar et al. |
| 6,528,797 B1 * | 3/2003 | Benke et al. ............... 250/393 |

FOREIGN PATENT DOCUMENTS

| | | |
|---|---|---|
| EP | 0 542 561 A1 | 5/1993 |
| EP | 0 743 538 A2 | 11/1996 |
| WO | WO 98/52071 A | 11/1998 |

OTHER PUBLICATIONS

R. Redus et al., *An Imaging Nuclear Survey System*, IEEE Transactions On Nuclear Science, vol. 43, No. 3, Jun. 1996, pp. 1827–1831.

Roger Y. Tsai, *A Versatile Camera Calibration Technique for High–Accuracy 3D Machine Vision Metrology Using Off–the–Shelf TV Cameras and Lenses*, IEEE Journal of Robotics and Automation, vol. RA–3, No. 4, Aug. 1987, pp. 323–345.

(Continued)

*Primary Examiner*—David Porta
*Assistant Examiner*—Christine Sung
(74) *Attorney, Agent, or Firm*—Workman Nydegger

(57) ABSTRACT

Apparatus and methods for measuring activity of radioactivity at a source location within an environment provided. The method in particular includes measuring emissions using an instrument as a measurement location, which instrument includes a detector, the instrument considering a detector field of view of the environment, which field of view includes a source location and providing an indication of detected emissions for that field of view, correcting the detected emissions to give emitted emissions in respect of that field of view, the correction being achieved by using a correction factor specific for that field of view, the correction factor accounting for one or more field of view format and/or the attenuation between the source location and the detector and/or the distance between the source location and the detector, the emitted emissions being indicative of the activity.

17 Claims, 5 Drawing Sheets

OTHER PUBLICATIONS

O. Sima, *Applications of Monte Carlo Calculations to Gamma–spectrometric Measurements of Environmental Samples*, Applied Radiation and Isotopes, Pergamon Press Ltd., vol. 47, No. 9–10, Sep. 10, 1996, pp. 919–923.

Abstract of Japanese Patent Publication No. 03092788, published Apr. 17, 1991.

Karl A. Hughes et al., *Upgrading the Radscan™ 600 GAMMA Scanner to Produce Dose Maps in Three Dimensions*, The 5th International Conference on Nuclear Engineering, May 26–30, 1997.

Karl Hughes et al., *Activity Assessment*, BNFL Commercial, Issue 1, Technical Report, Apr. 9, 2001.

A.V. Chesnokov et al., *Determination of Surface Activity and Radiation Spectrum Characteristics Inside Buildings by a Gamma Locator*, Nuclear Instruments and Methods in Physics Research A401, 1997, pp. 414–420.

* cited by examiner

| | Percentage of radiation attenuated by 10mm of matrix | | | | |
|---|---|---|---|---|---|
| Material / Energy | Lead 11.3 g/cc | Steel 7.8 g/cc | Steel 1.5 g/cc | Concrete 2.2 g/cc | Polythene 1.0 g/cc |
| 186 keV (Uranium) | 99.9997% | 67.5% | 19.4% | 24.2% | 13.3% |
| 222 keV (Plutonium) | 99.974% | 62.6% | 17.2% | 22.9% | 12.6% |
| 375 keV (Plutonium) | 93.4% | 52.0% | 13.2% | 19.3% | 10.6% |
| 662 keV (Cs-137) | 68.8% | 43.2% | 10.3% | 15.6% | 8.4% |
| 1001 keV (U-238) | 53.6% | 37.1% | 8.5% | 13.0% | 7.0% |
| 1332 keV (Co-60) | 46.0% | 33.1% | 7.4% | 11.4% | 6.1% |

INVESTIGATIONS OF RADIOACTIVITY

CROSS-REFERENCE TO RELATED APPLICATIONS

This application claims priority to Great Britain Application Nos. 128354.8, filed Nov. 27, 2001 and 0129264.8, filed Dec. 7, 2001, which applications are incorporated herein by specific reference.

BACKGROUND OF THE INVENTION

1. The Field of the Invention

This invention is concerned with improvements in and relating to investigations of radioactivity, particularly, but not exclusively, in relation to measurement of activity and/or the quantity of radioactive material present at one or more locations.

2. The Relevant Technology

Techniques are known for investigating environments to map the locations of radioactive emitters and/or identify the radioactive emitters present within the environment. In basic terms the information provided to the operator indicates the emissions detected by the detection instrument. Whilst this is informative in many cases, it is desirable to be able to estimate the actual quantity of radioactive material present at locations within the environment. This may be expressed as a mass or more normally in terms of an activity at a location. To be able to achieve this, the emissions emitted must be determined rather than relying on a measurement of the emissions. Intervening effects on the emissions between emission and detection are not generally quantified in existing techniques, particularly in the widely varying environments and circumstances encountered by survey instruments.

SUMMARY OF THE INVENTION

The present invention has amongst its aims to quantify the radioactive material present at one or more locations within the environment. The present invention has amongst its aims to express the level of activity at one or more locations within an environment. The present invention has amongst its aims to provide more accurate measurements and/or estimates of radioactive emissions.

According to a first aspect of the invention we provide a method of measuring activity of radioactive material at a source location within an environment, the method including:

measuring emissions using an instrument at a measurement location, which instrument includes a detector, the instrument considering a detector field of view of the environment, which field of view includes the source location and providing an indication of detected emissions for that field of view;

correcting the detected emissions to give emitted emissions in respect of that field of view;

the correction being achieved by using a correction factor specific for that field of view, the correction factor accounting for one or more of the field of view format and/or the attenuation between the source location and the detector and/or the distance between the source location and the detector;

the emitted emissions being indicative of the activity.

Preferably the correction factor corrects for more than one of the field of view format, the attenuation and the distance. Preferably all three are accounted for in the correction factor. It is further preferred that the correction factor includes a calibration factor.

The field of view format correction is preferably the same for all fields of view using a given scanning regime and/or collimator design and/or detector configuration. Preferably the field of view format correction is the same for all fields of view where the scanning regime, collimator design and detector configuration are all the same. Preferably the field of view format correction corrects for variation in the extent of sampling of the environment with different sampling regimes. Preferably the field of view format correction accounts for the pan and/or tilt movement level between adjoining fields of view.

Preferably a plurality of fields of view are considered. Preferably adjacent fields of view in a pan direction overlap with one another. Preferably adjacent fields of view in a tilt direction overlap with one another. A plurality of fields of view may be used to inspect a single measurement location. A plurality of fields of view may be needed to include the whole of a source of radioactivity within their area of consideration.

Preferably the method is employed where the deviation between maximum and minimum count rate is within 10% of the ideal for a given angular variation between one field of view and an adjacent field of view. Preferably the angular variation between one field of view and an adjacent field of view is no more than 80% of the full plain width angle of the field of view.

Preferably the distance correction is based on a distance measurement. The distance correction can be based on prior knowledge of the distance. Preferably the distance correction relates to the inverse square law. The distance measurement may be experimentally obtained, for instance using a rangefinder provided on the instrument. The distance may be obtained from other input routes. In particular the distance measurement may be obtained from prior knowledge of the environment and/or components thereof. The prior knowledge may be derived from plans and/or from physical or visual inspection and/or from other radiometric investigations and/or from other information sources on the position and configuration of the environment and/or components thereof and/or parts of components thereof. The distance may be obtained by considering the distance between the instrument, particularly the detector, and the location or part thereof within the field of view. The distance may be measured to the part of the environment on the central axis of the field of view. More than one distance measurement may be employed where more than one location for emissions is known or anticipated. The distance may be one or more discrete values and/or a range value between which emitting materials need to be considered.

The distance measurement may be derived from investigations accompanying the method. For instance the distance may be derived from video inspection of the environment prior to and/or during the method's application.

A combination of prior knowledge and further investigations may be used to generate the distance measurement.

Preferably the attenuation correction accounts for one or more of the material, elemental make up of the material, thickness of material or density of material encountered in the field of view between the detector and one or more of the sources. The materials encountered may be considered with respect to the central axis of the field of view. The distance between the attenuating material and the detector and/or distances therebetween may be considered. The distance between the emissions and the attenuating material and/or the distances therebetween may be considered. Preferably an account is made in the attenuation correction for the material encountered, thickness of material encountered and density of material encountered. The attenuation correction may be an aggregate correction based upon different materials and/ or different elemental make ups and/or different thicknesses of materials and/or different densities of materials encountered between the detector and one or more of the emission sources.

The attenuation correction may be based on prior knowledge of the environment or one or more components thereof. The prior knowledge may comprise plans of the environment and/or details of the materials of the environment or components thereof and/or details of components added to the environment and/or results from other prior investigations. Other prior investigations may include materials testing, environment inspection or the like, including visual and other spatial position determining inspections.

The attenuation correction may include information from investigations accompanying the method. The investigations may occur prior to and/or during the implementation of the method. In particular video inspection of the environment and/or parts thereof may be used in this regard. The video information may reveal details of the materials and/or configuration and/or locations and/or dimensions of the materials which contribute to attenuation.

The method may include a determination that attenuation correction is not required in the correction. This determination is preferably based on a consideration of the field of view and the environment and its components. A decision not to correct for attenuation may be reached where the attenuation between the emission source and the instrument in any particular field of view is less than 10% of the emitted emissions.

The method may include deciding to apply the attenuation correction according to a first grade of modelling. The first grade of modelling may be a simple model. The first grade of modelling may be the use of an exponential calculation, for instance $\exp(-\mu\rho x)$. The first grade of modelling may be used where the extent of attenuation is below 25% and/or where the level of attenuation is determined to be consistent between a plurality of fields of view. The plurality of fields of view in this case may be at least 10 fields of view, more commonly at least 20 fields of view. The first grade of modelling may be applied where the extent of attenuation is below 25% for methods using LRGS detectors. The first grade of modelling may be used where the extent of attenuation is below 95% where the method uses HRGS detectors. The first grade of model may be applied where a consistent level of attenuation is expected with respect to a particular part of the environment and/or a particular component within the environment and/or a particular location and/or a particular emission source.

The method may include a decision to apply a second grade of modelling to provide the attenuation correction in certain cases. The second grade of modelling is preferably applied by the method when the extent of attenuation is above 25% and/or where the level of attenuation is determined to be inconsistent between a plurality of fields of view. Preferably the second grade of modelling is a higher grade, in terms of accuracy, than the first grade. Preferably the second grade of modelling is based upon Monte Carlo Neutron and Photons modelling software and/or RANKERN modelling software and/or MCBND modelling software and/or non-transport modelling techniques. Preferably the second grade of modelling includes modelling the detector in an unshielded configuration. A point shield and/or a point emission source may be considered. Preferably the model acknowledges that low angle scatter radiation is detected by the detector.

The calibration factor is preferably included in reaching the correction factor for each field of view. The calibration factor is preferably constant for consideration of a given isotope and/or consideration of a given measurement manner and/or for consideration of a given detector. Preferably the calibration factor accounts for the detector's efficiency. Preferably different calibration factors are applied for different isotopes. Preferably different calibration factors are applied for different measurement manners, particularly between net peak area and/or gross peak area and/or peak height measurement manners. Preferably the calibration factor is determined by experimental testing using known sources at known locations. Preferably the calibration factor is determined in respect of a particular detector and/or in respect of a particular measurement manner.

Preferably the region of interest within the spectrum for which detected emissions are taken excludes down scattered radiation from other isotopes. This position may be confirmed within the method by considering high energy isotopes first and progressing downwards where such downward scattering would not occur and/or this position may be confirmed by historical information which indicates the isotopes anticipated to be present and that these would not lead to downward scattering into the region of interest. Preferably the region of interest or regions of interest used are regions of interest for which the photopeak is proportional to a gross count rate for the region of interest within the spectrum.

Preferably the emitted emission level equates directly to an activity. Preferably the emission rate equates to a mass of material for a given isotope. The method may include an isotope determination step.

Preferably the measure of detected emissions is a detected count rate. Preferably the emitted emissions is expressed as an emitted count rate.

According to a second aspect of the invention we provide apparatus for measuring activity of radioactive material at a source location within the environment, apparatus including an instrument which includes a radiation detector, the radiation detector being collimated to define a detector field of view of the environment;

a detector signal processor to give an indication of detected emissions for a field of view of the collimated detector;

a correction processor which applies a correction factor for a particular field of view to the indication of detected emissions for that field of view;

a correction factor provider, which provides correction factors accounting for one or more of the field of view format and/or the attenuation between the source location and the detector and/or the distance between the source location and the detector; and an indicator of the activity derived from the emitted emissions calculated.

The second aspect of the invention may include any of the features, options or possibilities set out elsewhere in this document, including those set out above in the first aspect of the invention.

One or more of the parts of the apparatus may perform dual functions.

BRIEF DESCRIPTION OF THE DRAWINGS

Various embodiments of the invention will now be described by way of example only, and with reference to the accompanying drawings in which.

DETAILED DESCRIPTION OF THE PREFERRED EMBODIMENTS

Data Collection

Figure 1:
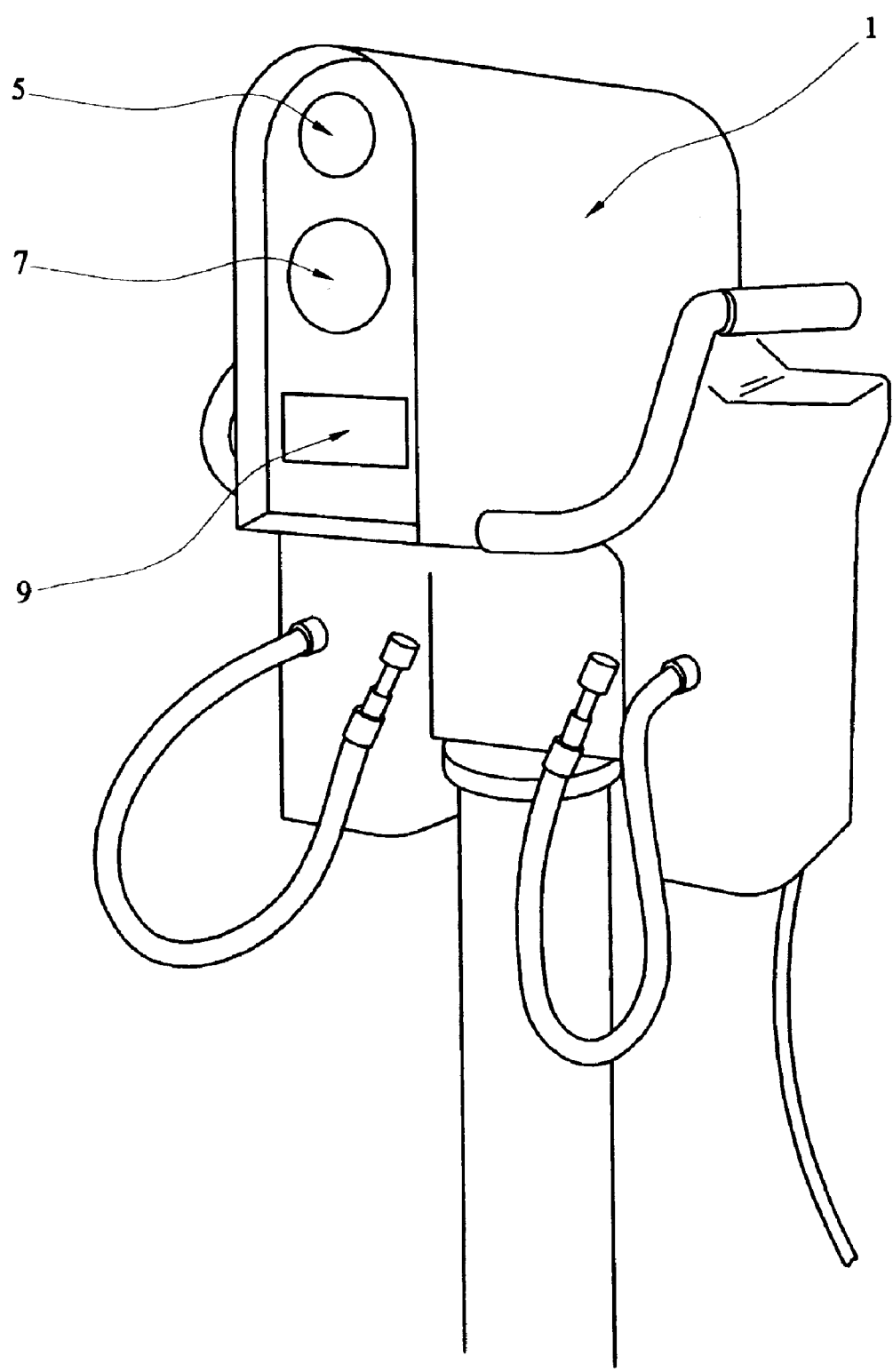
FIG. 1 illustrates one potential radiometric measuring system suitable for use in the present invention.

As an initial step in the technique it is necessary to obtain count rate information for a series of fields of view of the environment generally all taken from the same viewpoint. A system suitable for use in this regard is illustrated in FIG. 1 and comprises an inspection head 1 which is connected to a remote operator consol (not shown). The head 1 is capable of pan and tilt movement controlled from the consol by the operator, or automatically movement according to a predetermined program. The head 1 includes a video camera 5, a gamma detector 7 and a laser range finder 9. A tungsten collimated sodium iodide scintillator is preferred, but other collimating materials and/or detector materials can be employed. The tungsten collimator containing the detector has an aperture with a plane angle width of 4° in its preferred configuration. Interchangeable collimators offering widths of 3° and 2° are provided.

The operator consol includes a computer to process data, a video display unit (VDU) and video cassette recorder (VCR). Other data recorder units, for instance a read-write CD-rom unit may be used. The VDU displays the video image from the camera on the head 1 and a circle is imposed upon this to indicate the field of view of the collimated scintillator. The operator consol also receives information concerning the pan and tilt angles of the head and the range to the object in the centre of the field of view, which is encountered first, as determined by the laser range finder 9.

The VCR is used to record the contents of the VDU screen and allows recall of the video data at a later date or the replay of previous scans through the consol. Other data recording mechanisms are possible.

The scanning operation of the head can be controlled manually through the consol, but automatic scanning is preferred for generating the inputs for the present invention. A rectilinear raster scan across the environment from top to bottom is possible.

During operation the instrument outputs data to an output file which includes the pan and tilt angles of the head, a range finder distance for the centre of that particular field of view and count rates for different energy bands originating in that field of view. A multi-channel analyser, for instance Maestro available from EG&G Perkin Elmer, may be used to receive the values for the various ranges. The monitoring apparatus thus provides a measure of the count rate and the energy deposited by each photon interacting with the detector. The contribution from the gamma radiation along a narrow angle of incidence only is determined (but including low angle scatter radiation).

Whilst the subsequent technique is described with reference to information collected by a system of the above described type it is applicable to a wide range of low and high resolution gamma scanning instruments and/or other two-dimensional gamma ray imaging devices. Equally, whilst the technique is described below in relation to a particular isotope and a particular region of interest, ROI, (expressed in keV), the technique is widely applicable to other isotopes, other elements and other ROI's.

Overview of Technique

In seeking to determine activity, the technique seeks to provide a correction factor for each radiation detector field of view of the environment. Ideally the correction factor takes into account the inverse square law effect of distance between the instrument and the location of the emissions and/or attenuation along the path between the source of the emissions and the instrument and/or the scanning regime employed. The invention preferably provides optimised and validated scanning of the environment, the use of optimised and validated ROIs, proper accounting for distance factors and proper attenuation correction. In effect the investigation of the environment is made by a large number of fields of view which are considered together, but for which variable corrections are applied. This renders each individual measurement as accurate as possible. This compares with large field of view instruments which have no capability for handling varying efficiencies across the field of view, but for which significant variation with different directions within the field of view can be expected.

The invention accounts for the effects of the scanning regime by providing an optimised scanning regime for any environment which provides efficient and correct sampling of the environment but whilst avoiding over sampling. Over sampling can give rise to unnecessary high sampling times for the environment as a whole.

In accounting for the inverse square law effects, the most appropriate distance value possible between the instrument and the source of the emissions is considered. In general this is a range finder based measurement, but qualified where necessary by prior knowledge information on the environment where that indicates that the first object encountered by the range finder is not the most likely source of the emissions. Further details of this consideration are provided below.

In considering the effects of attenuation the invention aims to provide attenuation correction linking the ratio of count rate without attenuation to the count rate with attenuation based on the attenuation contribution. This is done for each measurement point, and accounts for thickness of material, elemental material make up, density and attenuated material location within the environment which is relevant to that measurement point.

In general the factor relating to the scanning regime is the same for all measurement points in an environment, but the distance and attenuation factors are provided with an unique value calculated for each measurement point, thereby giving unique overall correction for each point.

The final part of the correction factor is achieved by introducing a calibration factor which is different for each isotope and different for each manner of measurement of the emissions.

When combined together all four factors allow for the detected emissions to be converted back to emitted emissions and thus give an activity for the particular location concerned. When this process is applied to a large number of measurement points within the environment, full qualification of activity can be achieved.

Consideration of Scanning Regime

Care and attention has to be taken to ensure that all parts of the environment are scanned uniformly. Using a two-dimensional scanner, in which a series of fields of view for which count rates are obtained are stitched together, it is important to ensure that the extent of movement between one field of view and an adjacent one is appropriate. One-dimensional scanning is unfortunately inappropriate as the count response in such a case would only be uniform in the direction of travel.

Figure 2:
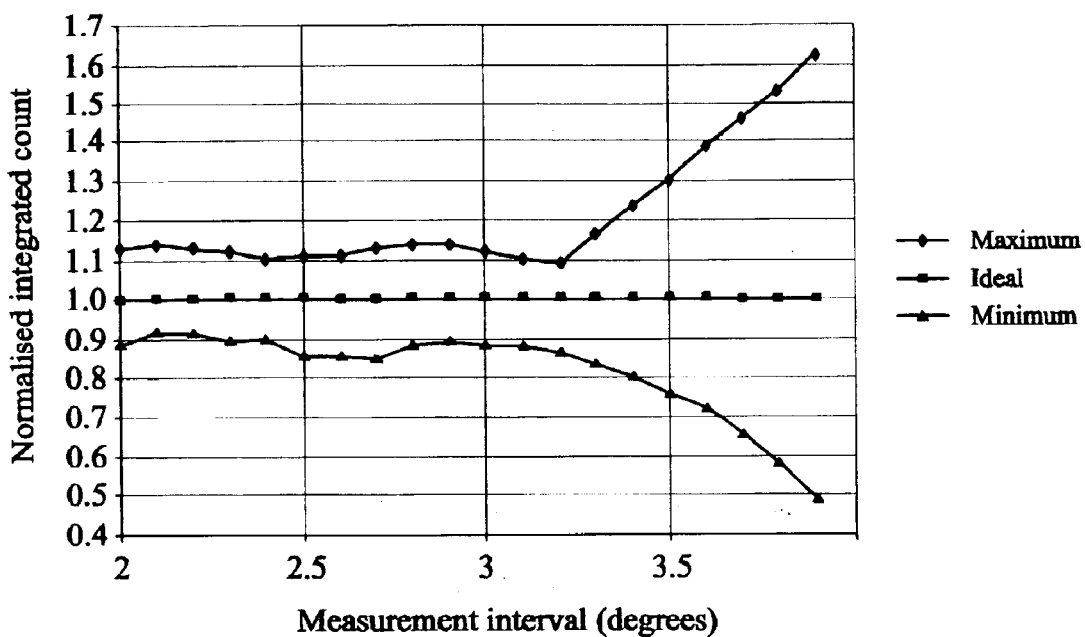
FIG. 2 illustrates the variation in normalised integrated count with measurement interval in degrees for various scanning set ups.

FIG. 2 illustrates the extent of variation of the normalised integrated count with measurement interval (expressed as degrees) between the centres of the fields of view in adjoining fields of view for a 4° field of view. By determining the total response to a point source integrated over an entire scan, an assessment of how well the response functions of the apparatus behave when stitched together can be achieved. Thus a single point source within the environment was considered using a series of different scan runs. In some of these scan runs the source may have landed exactly on the centre of one of the fields of view, whereas in others the source may have only fallen part way between the centre and periphery of the field of view. This would depend upon where exactly the first field of view occurred. It would also depend upon the separation of the fields of view from one another. Ideally each scan run should give the same result if an accurate measurement of the source is to be achieved irrespective of the fortune in where it might lie within the field of view.

As illustrated in FIG. 2 as the pitch angle between one field of view and the next increases the potential variation alters; the value for any one run has a level between the minimum and the maximum. Below around 3.2° the deviation between maximum and the minimum count rate measured is within 10% of the ideal. Above 3.2°, however, substantial deviations occur. As a consequence for a 4° field of view a pitch of 3.2° or less was deemed acceptable for use in scanning regime. A similar pitch would be used between one row and the next row below it just as between the fields of view in one column and the next. In practice, therefore, a 2° pitch is used.

The same manner of calculation, whether performed experimentally or theoretically, could be used for other field of view angles and/or other collimator designs.

The overall result of this is to generate a correction factor which applies a weighting to the count rate to account for the degree of sampling relative to a given level defined as normal.

Validation of Selection of Region of Interest in Spectrum

The particular system described collects gamma ray spectrum information across the spectrum, but only extracts gross count rates for one or more non-overlapping regions of interest, ROI's, within the spectrum. Consideration of the variation in the gross count rate for the ROI with varying amounts of material between the detector and the source is important in establishing whether the ROI is informative about the photopeak for an isotope and hence about the quantity of radioactive material present. The activity is most easily linked to the count rate of the photopeak of the spectrum for any particular isotope. Any distortion, and distortion invariably occurs if any intervening materials between the detector and the source exist, could thus have a significant impact.

Figure 3:
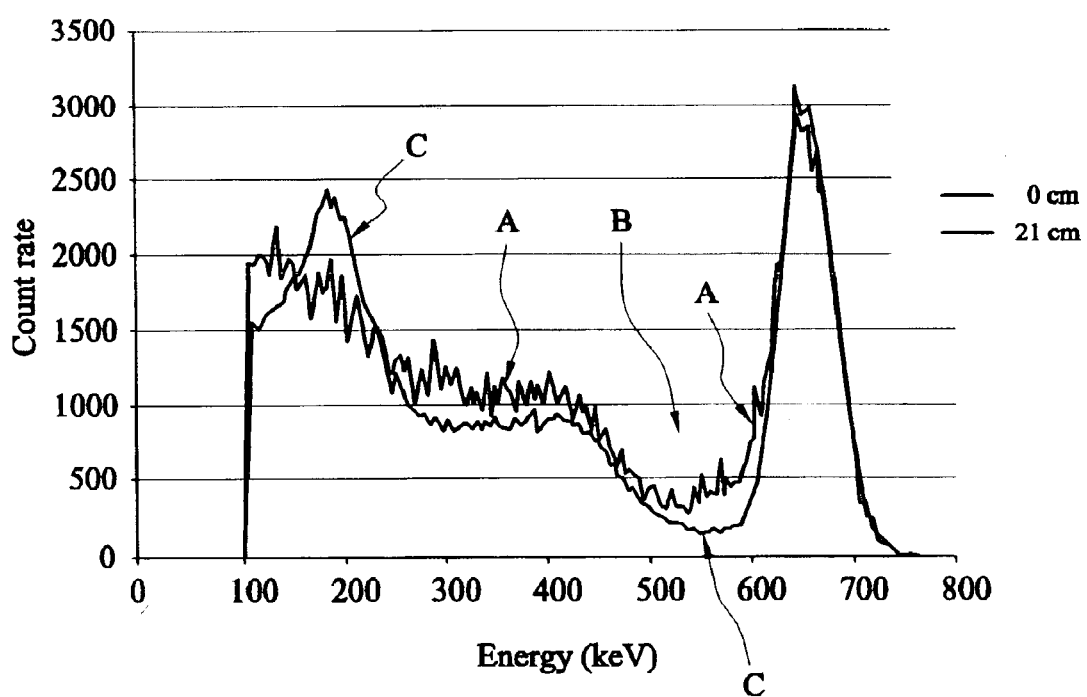
FIG. 3 illustrates the normalised spectra obtained for a Cs-137 source with and without 21 cm of concrete between the source and the detector.

As illustrated in FIG. 3, the presence of 21 cm of shielding in the form of concrete, does cause significant down scattering of the spectra for Cs-137 with the spectra A partially filling the trough B in the material free spectrum C. The photopeaks have been normalised to give equal heights.

Figure 4:
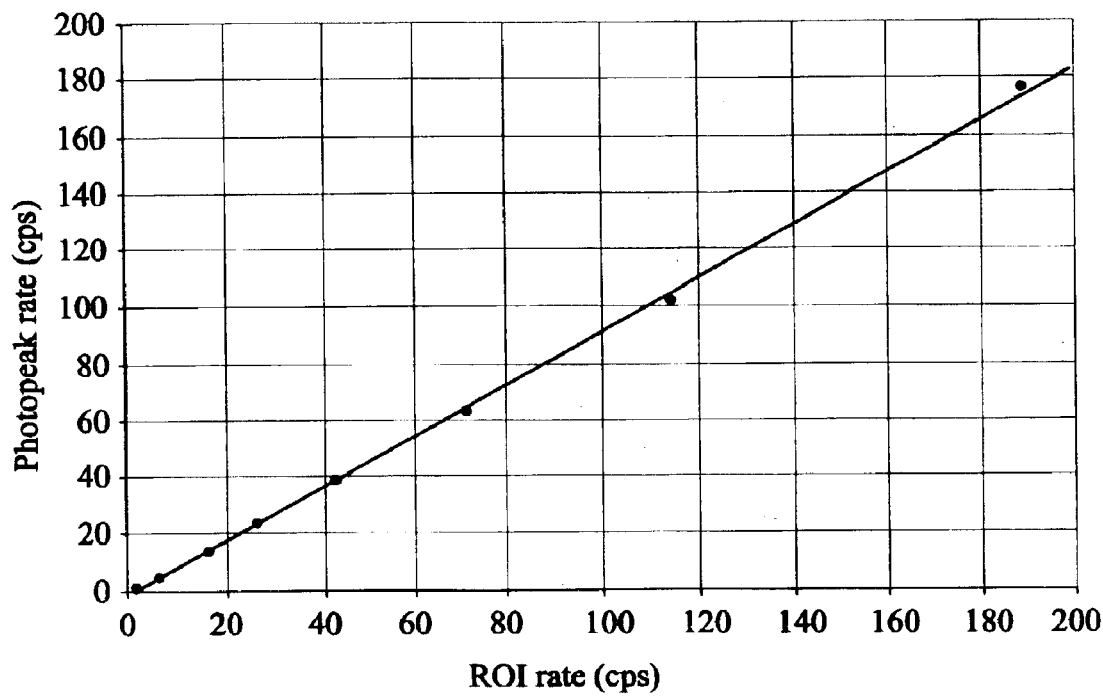
FIG. 4 illustrates the photopeak count rate against a region of interest gross count rate for Cs-137.

By considering the ROI count rate, however, against the photopeak rate for varying thicknesses of shielding material, in this case, concrete, it is possible to establish whether the photopeak rate is linked to the ROI count rate. Where a good correlation such as the one exhibited in FIG. 4 is achieved, the ROI gross count is sufficiently proportional to photo peak count rate for it to be used for the purposes of activity measurement.

To ensure that the gross count rate for the ROI is indicative only of the isotope of interest, careful consideration needs to be given to whether other isotopes which might be present will contribute photopeaks or significant amounts of down scattered radiation to the selected ROI and/or as to whether the ROI will include other photo peaks for the isotope of interest. The assessment of which isotopes can be measured can be made on a case by case basis depending upon the isotopes of interest, other isotopes which may also be present and their interrelationship. Cs-137, however, amongst others has been identified as validly measurable in most practical cases using the present technique.

Consideration and Accounting for Distance Measurements

Any assessment of activity is significantly impacted upon by the accuracy with which the distance to the source is known (due the inverse square law effect—for each factor that the distance is ruled by the activity will be ruled by the same factor ^2 as increased distance gives decreased detected counts for an emission source of the same activity.

The laser range finder of the present system has a measurement accuracy of around 1 cm at a 1 meter distance. Distances shorter than this are rarely encountered. At greater distances the percentage error is decreased still further. Accuracy of this level is sufficient to address errors arising from the inverse square law effect of distance of detected count rates compared with emitted count in terms of rangefinder accuracy.

A more significant source of problem occurs, however, if the first object encountered by the laser range finder is not in practice the source of the radiation. This may occur where a pipe for instance obscures the view of a wall behind it and the radiation is actually on the wall. The laser range finder in this case measures the distance to the pipe, whereas the source is actually far further away, and hence for the same count rate measured would have a significantly higher activity.

Figure 5:
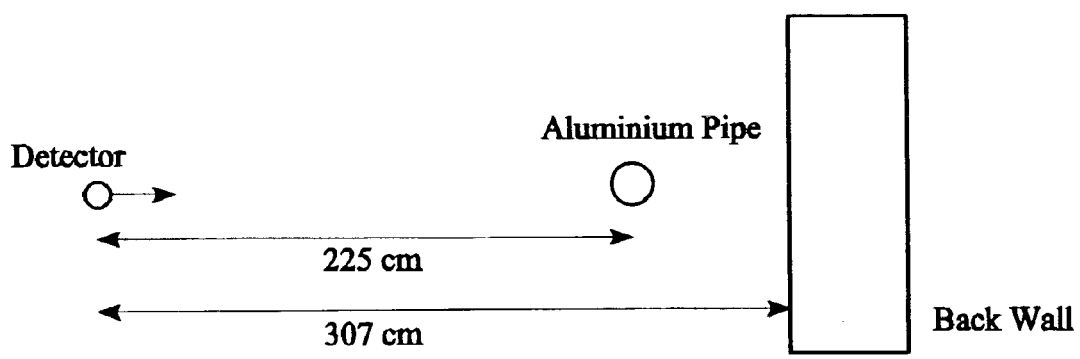
FIG. 5 illustrates the validation set up investigating impact of negligible shielding.

Referring to FIG. 5 the significance of accurate distance information is exemplified. In FIG. 5 the apparatus considers a pipe 225 cm from the detector and a back wall 307 cm from the detector. The pipe is of aluminium and is given a wall thickness of 3 mm (thereby giving a transmission 94% at 662 keV). The pipe's diameter was set at 7.6 cm.

Two scenarios were considered first with a 295 MBq Cs-137 source located inside the pipe, and a second scenario with the same source located on the wall directly behind the pipe. In each case an automatic scan was performed that covered the area containing the source. The results for each scan were analysed, first assuming that the range measurement by the instrument for each measurement point corresponded to the position of each source, and secondly based upon the known range to the source either 225 cm or 307 cm.

The results were 444 MBq based on measured range, and 285 MBq based on known range with the source in the pipe, and 216 MBq using a measured range, and 260 MBq using a known range with the source on the wall behind the pipe. The error in the measured range is due to the fact that part of the field of view is concerned with the wall behind the pipe, and as a consequence part of the activity is attributed to the wall behind the pipe.

This example demonstrates the importance of establishing the actual location of the activity being measured as emissions from behind an item could give a significantly erroneous result if the range were taken to be the range to the first item encountered by the range finder.

Two principal routes for addressing this issue of true position were validated. One or both will be employed dependant on the case in question and the practicalities of using the routes.

Firstly, in many cases, the environment will have a use history which will include details of the environments layout and the locations within it where radioactive materials might have occurred. Thus an environment where the laser range finder picks out the distance to a front pipe, where there is another pipe behind it and a wall behind that, may not result in the first pipe being assigned the location of the radioactive material. For instance, if the first pipe was a clean water supply pipe, the second pipe was an active waste liquor pipe and the wall was known to be clean, then the radioactive location would be assigned to the inside of the second pipe. The location of the second pipe and hence distance from the detector should be derivable from construction data. Other scenarios based on other information and structure are of course possible. Other relevant information in this area might include the isotopes the plant was exposed to, passed survey reports use the type generating count rate and directional information from known locations to emission sources and details of spillages or other events.

In some cases this historical information could also be supplemented by information derived from the video images taken of the environment by the instrument prior to or during a survey. Thus the video information may indicate additional materials present above and beyond those recorded on plant plans and/or a different configuration of those materials at the time of the survey to the recorded position.

It should be noted that prior knowledge of the history and/or other information may lead to the emissions being deemed to arise from a point source or from distribution of locations along the axis of the viewpoint. The first case could be represented by contamination on a surface, for instance a wall. The second situation could be represented by homogenous distribution of radioactive material within a drum. In some cases two or more point sources may be attributed the radioactive material equally, for instance surface contamination on a drum would give rise to two intersections with a measurement view.

The points or distribution in such cases may be treated equally or historical information may point to an uneven distribution and hence allocation of the emissions.

The other principal route is to use further viewpoints within the environment to establish more detail of the radioactive materials location. Thus in the above example when viewed from a more sideways viewpoint, the first and second pipes and relevant part of the wall are all spaced from one another and hence any indication of the radioactive material location will point more firmly at one of the three possibilities. Even if still obscured the second viewpoint may assist to discriminate between possible locations and hence give accurate distances.

All of this information singularly or more appropriately in combination, can be used to allocate a corrected distance measurement between the instrument and the emission source for each measurement point. The result enables a more accurate correction for distance to be made using this technique.

Whilst such information is considered individually for each pan and tilt angle and hence measurement point, in many cases equivalent factors will be involved thus simplifying the calculations or considerations involved.

Validation of Accounting for Attenuation

Most important in the present technique is the optimisation of allowance for the impact of attenuating materials on the measurements made by the detector. The validation set out below has established a number of options, including:

i) in certain, limited cases, the amount of attenuating material is such as to have no impact on the accuracy of results achieved given the accuracy achievable on other issues;

ii) where the amount of attenuating material does have an effect then basic approximations of the attenuating materials impact assist in making the result more accurate; and iii) in cases of significant shielding or shielding in complex shapes it was established that basic approximations of the attenuating materials impact were error prone and that a more sophisticate correction process to account for the attenuating materials effect was useful and functioned well.

For each measurement point, therefore, the present inventive technique provides an account for attenuation through an attenuation correction factor obtained using one or more of these quantifications. The most appropriate quantification in any measurement scenario will depend upon the level of accuracy required compared with the speed of processing desired. In either event, however, the invention differs distinctly from the prior art by accounting for attenuation independently in each measurement point. The concepts will now be described in more detail.

As there is an inherent sampling error plus or minus 10% in the data collection and smaller percentage errors for the calibration and range correction it is possible to allow attenuation of up to 10% without grossly affecting the total uncertainty in the result.

Figures 6, 7:
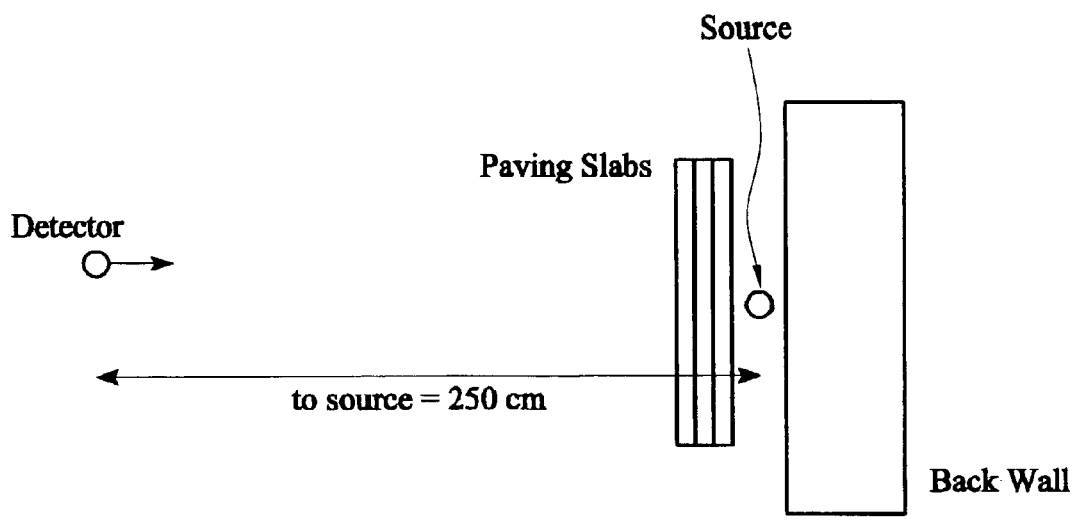
FIG. 6 illustrates a table of attenuation effect by 10 mm of the given materials on different incident energies.
FIG. 7 illustrates an experimental set up investigating the impact of significant, consistent shielding.

FIG. 6 provides a table illustrating the effect of 10 mm of some typical materials on various energies of emission. As can be seen, the point at which attenuation can be deemed negligible varies from material to material. Up to 2 mm of steel, 5 mm of aluminium or 6 mm of concrete can reasonably be tolerated for 662 keV CS-137. Prior knowledge of the materials forming components within the environment and/or subsequent analysis can be used to establish where and when attenuation effects are negligible and hence can be discounted.

In other situations the attenuation is above the negligible level and needs to be accounted for.

Referring to the scenario illustrated in FIG. 5, but with the aluminium pipe replaced with a steel pipe of wall thickness 4 mm and 4.8 cm diameter, significant attenuation occurs. In this case measurements were made with the source in the pipe and on the wall immediately behind it again. An additional measurement in front of the pipe was also made. All distances were known distances. Activity assuming negligible attenuation by the material was calculated, as was activity based on an estimate of attenuation. The results are set out in Table A.

TABLE A

| Scene | Activity Based on Negligible Attenuation | Activity Based on Estimated Attenuation |
|---|---|---|
| 295 MBq Cs-137 in front of pipe | 286 MBq | 286 MBq |
| 295 MBq Cs-137 in pipe | 247 MBq | 310 MBq |
| 295 MBq Cs-137 on wall | 165 MBq | 260 MBq |

The estimated attenuation factors gave results within 15% of the true activity, but the negligible attenuation assumption gave results which were significantly below the actual level. The estimate technique in this case was based on the simpler exponential calculation described in more detail below.

With still higher levels of shielding, the use of estimates of the above type was established by the validation technique to be inappropriate.

In the FIG. 7 scenario, a 295 MBq Cs-137 source was located behind a varying number of paving slabs. Each paving slab was measured to be 2.95 cm thick, and to have a density of 2.15 g/cc. Automatic scans were performed to ensure coverage of the scene that contained Cs-137 source with 0, 1, 2, 3, 4, 5 and 7 paving slabs in position. The known range rather than a measured range to the source was used in each case.

Figure 8:
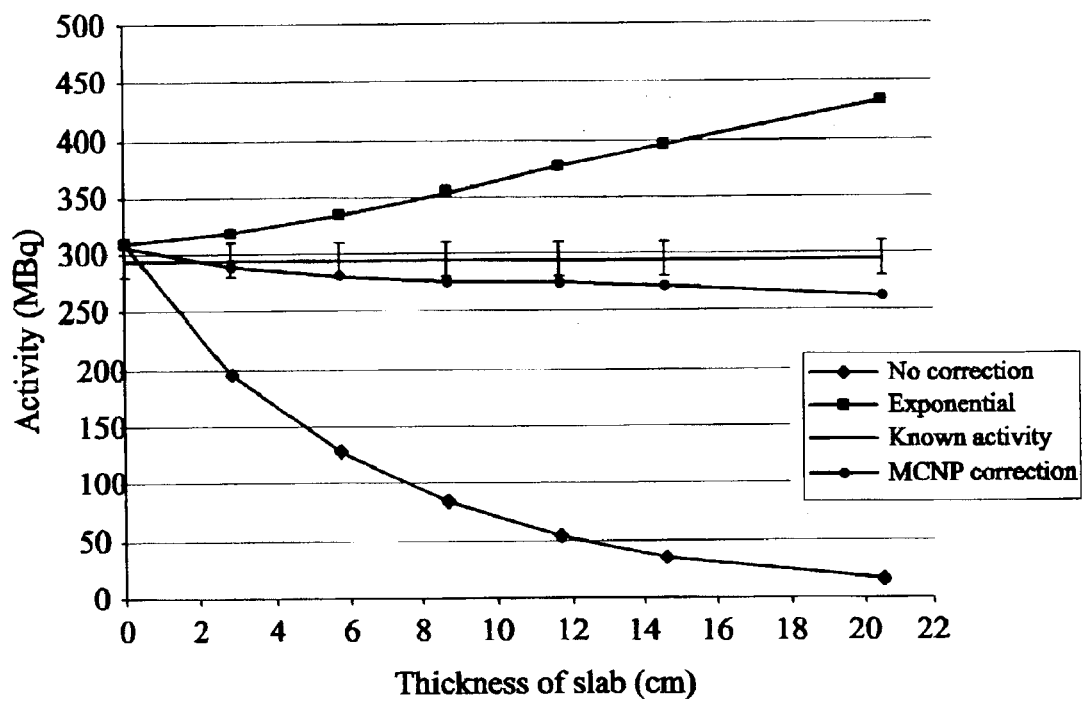
FIG. 8 illustrates activities demonstrated for the experimental set up of FIG. 7 using a variety of techniques.

The results achieved using an estimate based upon a simple exponential calculation, exp $(-\mu\rho x)$, are illustrated in the graph of FIG. 8 alongside zero correction figures. As can be seen, a very substantial over estimation of activity occurs using this technique. This was established to be due to the exponential equation only accounting for photons at the photo peak energy whereas scattered photons are still detected in practice as an ROI is being used.

The exponential corrected results, however, are better than the no correction results where very suppressed calculation of activity compared with the actual activity present results.

The best results, however, were obtained using a modelling process suggested and forming an important part of this overall technique.

The particular model employed was based on the Monte Carlo Neutron and Photons package available from Los Alamos Laboratories, but other packages such as RANKERN, MCBND or even non-transport techniques can be used. The key features in these models is that they represent an effective and accurate consideration of the materials, environmental configuration and thicknesses of materials involved in the cause of attenuation.

In the case of simple shielding, the model is set up with a point source, a point detector and shielding of the appropriate material. The relative tally is varied between there being no shielding present and there being the actual amount of shielding present. The tally used was applied for the whole ROI and included scattered radiation. The relative response arising is then the correction factor required to correct the measured count rate for the effect of attenuation and hence reach the quantity measurement.

In relation to more complex shielding systems. The model uses a point source and point detector (to assist processing speed), but considers the detector to be uncollimated so as to ensure that low angle scatter gamma rays are still accounted for in the count. In practice, such gamma rays are measured as the regions of interest, ROIs, in the spectrum are relatively broad.

As can be seen from FIG. 8, the result throughout using such a model to give correction was within 5% of the actual activity, and even closer when the +/−5% uncertainty in the actual activity is included, as represented by the error bars on the plot of FIG. 8.

However, as illustrated with reference to FIG. 9, non-simple shielding situations can occur in many cases.

Figure 9:
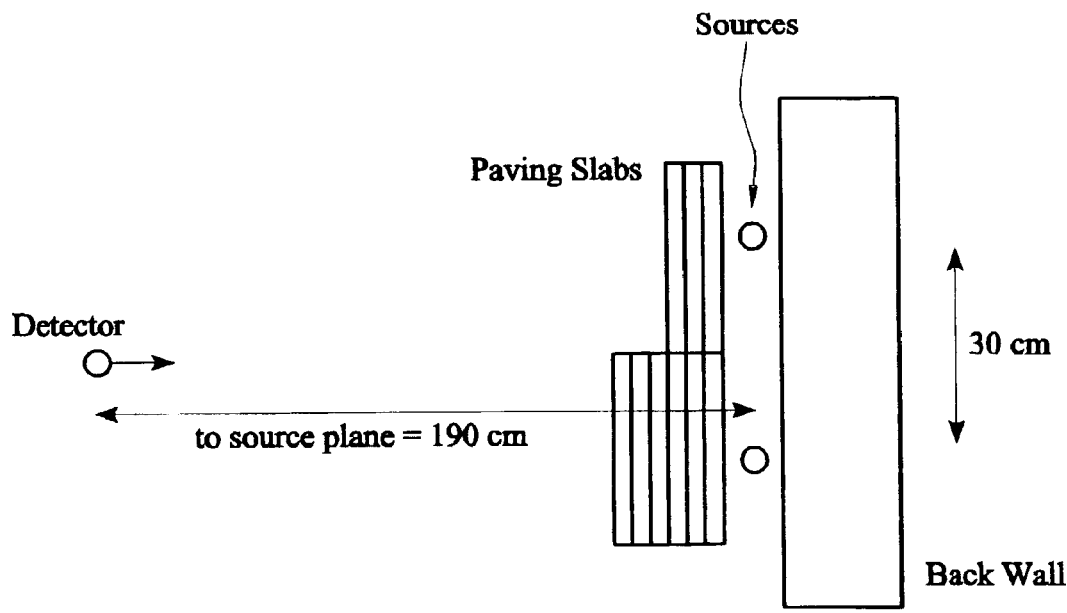
FIG. 9 illustrates an experimental set up of significant non-consistent shielding.

In this case, two measurements were performed with the geometry shown in FIG. 9. In one instance, with a 295 MBq-Cs-137 source located behind the 6 paving slabs part of the shielding, and a 31 MBqCs-137 source located behind the 3 paving slabs, and in the second instance, with both sources, totalling 326 MBq, located behind the 3 paving slabs. Again, in each case an automatic scan was performed that covered the area presented by the paving slabs, with a 570–740 keV ROI being considered.

Without accounting for the attenuation, the count rate from the greater source behind the greater level of shielding was only just over a factor of 2 greater than the count rate for the smaller source behind the smaller level of shielding; this being despite the fact that the actual difference in activities is a factor of 9.5 different.

Using the modelling process much better results were achieved as set out in Table B.

TABLE B

| Geometry | Exponential Correction | MCMPROI Correction | MCNP Less Background |
|---|---|---|---|
| 295 MBq behind 6 slabs 31 MBq behind 3 slabs | 600 MBq | 370 MBq | 359 MBq |
| 0 MBq behind 6 slabs 326 MBq behind 3 slabs | 446 MBq | 336 MBq | 331 MBq |

The exponential correction once again yields a systematic over-estimate with the over-estimate being worse when the source is behind the thicker shielding.

The model based correction factor that includes scattered radiation gives only slight over-estimates of the activity present compared with the actual known activities. Accounting for the background (either from noise within the system or from collimator penetration) gives a still further improved answer.

The model in this case was created to contain the key features of the more complicated geometry. The variation in geometry means that a single correction factor can no longer be applied in contrast to the more simple shielding modelling process set out above. In basic terms the model created a correction factor for each measurement point in the scan, i.e., the measurement achieved for each of the separate fields of view and this separate correction for each measurement point is key to the present invention.

The modelling input file in each case presents the same location for the detector and the slabs with the variable being the location of the source. For each point on the scan, the pan and tilt coordinates are used to determine the position of the source. A point source is located at the point where the projection of the pan and tilt vector from the point detector hits the source plane, this plane being at the known distance, 190 cm, from the detector's closest point.

The modelling files generated are all identical apart from the position of the source within them. Each file thus has exactly the same structure rendering them suitable for processing using macro functions such as are possible in Excel for instance. The detector files are thus processed to create the model input files and also to generate a batch file which is used to automatically run each of the model input files in turn. Use of a point detector simulation enables the run times required to be quite low and suitable for processing on PC level processors.

The information for the attenuation modelling process, or other way in which attenuation is accounted for in the attenuation correction, can be derived from plant history information such as the nature of materials present, the level of materials present, the position of shielding components relative to the radioactive emitters and the like. Plans and other historical information can be supplemented by video or other imaging information obtained prior to and/or during the activity assessment if necessary to confirm or vary or add to plant historical information.

Calibration Factor

The fourth component in the correction of the measured emissions to give emitted emissions is referred to as a calibration factor. In practice this is different for each isotope and different for each manner of measurement. For instance count rates based on area require a different calibration factor to those based on photopeak height consideration. The calibration factors are generally determined experimentally, the calibration factor takes into account detector efficiency. In particular a known activity of source may be placed at the centre of a field of view and a count rate determined for a relevant region of interest to that source. The known activity of the source allows the relative affects of that isotope and the particular manner of measurement to be determined as all the other variables in the system are known.

Other Matters

The invention above has been described in relation to consideration of point measurements in relation to fields of view, emission locations and the like, but it should be noted that the technique can be extended to account for the intersections of the conical fields of view with the environment if desired. This could give rise to more sophisticated allowance for distances within the field of view and/or source distributions and the like.

The technique offers an effective and accurate way of measuring activity within an environment appropriately corrected to ensure that the measurement reflects emitted emissions rather than the more commonly detected emissions. The technique achieves this using low resolution gamma measurements in most cases, thereby avoiding the major issues with the level of collimation needed with high resolution assistance. The system also functions successfully even where the geometry of the environment is complex and/or the emission source could be present at a wide range of locations and/or distances from the instrument. This contrasts markedly with assay type instruments in which a very tightly defined geometry and hence distance and emission sources is known.

What is claimed is:

1. A method of measuring activity of radioactive material at one or more source locations within an environment, the method including:

measuring emissions using an instrument at a measurement location, which instrument includes a detector, the instrument considering a first detector field of view of the environment and considering a second detector field of view of the environment which is different from the first field of view, which fields of view include a source location;

providing an indication of detected emissions for each field of view;

correcting the detected emissions to give emitted emissions in respect of the first field of view, the correction being achieved by using a correction factor specific for the first field of view; and correcting the detected emissions to give emitted emissions in respect of the second field of view, the correction being achieved by using a correction factor specific for the second field of view, the correction factors accounting for one or more of: the field of view format by applying to the detected emissions for a field of view a weighting which accounts for the degree of sampling of that field of view relative to a normal level of sampling of that field of view; and/or the attenuation between the source location and the detector by changing the correction factor between fields of view to account for the presence of different materials between the source location and the detector; and/or the distance between the source location and the detector by determining the distance between the detector and two or more potential source locations, establishing an actual source location from amongst the potential source locations and using the distance between the actual source location and the detector in the correction factor, the emitted emissions being indicative of the activity.

2. The method of claim 1 in which the correction factor corrects for all three of the field of view format, the attenuation and the distance.

3. The method of claim 1 in which the correction factor includes a calibration factor.

4. The method of claim 1 in which the field of view format correction accounts for the pan and/or tilt movement level between adjoining fields of view.

5. The method of claim 1 in which the distance correction is based on a distance measurement.

6. The method of claim 1 in which the distance correction can be based on prior knowledge of the distances or the distance measurements are experimentally obtained or are obtained from prior knowledge of the environment and/or components thereof.

7. The method of claim 1 in which the attenuation correction accounts for one or more different elemental make up of the material, different thickness of material or different density of material encountered in the field of view between the detector and one or more of the sources.

8. The method of claim 7 in which the attenuation correction is an aggregate correction based upon different materials and/or different elemental make ups and/or different thicknesses of materials and/or different densities of materials encountered between the detector and one or more of the emission sources.

9. The method of claim 1 in which the attenuation correction is based on prior knowledge of the environment or one or more components thereof.

10. The method of claim 1 in which the method includes a determination that attenuation correction is not required in the correction, this determination is based on a consideration of the field of view and the environment and its components and a decision not to correct for attenuation is reached where the attenuation between the emission source and the instrument in any particular field of view is less than 10% of the emitted emissions.

11. The method of claim 1 in which the method includes deciding to apply the attenuation correction according to a first grade of modelling, the first grade of modelling using an exponential calculation.

12. The method of claim 11 in which the first grade of modelling is used where the extent of attenuation is below 25% and/or where the level of attenuation is determined to be consistent between a plurality of fields of view.

13. The method of claim 1 in which the method includes a decision to apply a second grade of modelling to provide the attenuation correction when the extent of attenuation is above 25% and/or where the level of attenuation is determined to be inconsistent between a plurality of fields of view.

14. The method of claim 1 in which the correction factor includes a calibration factor and the calibration factor is constant for consideration of a given isotope and/or consideration of a given measurement manner and/or for consideration of a given detector.

15. The method of claim 1 in which the detected emissions form a spectrum, the spectrum is considered in terms of one or more regions of interest and the regions of interest within the spectrum for which detected emissions are taken excludes down scattered radiation from other isotopes.

16. The method of claim 1 in which the emitted emission level equates directly to an activity.

17. Apparatus for measuring activity of radioactive material at a source location within the environment, apparatus comprising:

an instrument which includes a radiation detector, the radiation detector being collimated to define a first detector field of view of the environment and moveable to define a second detector field of view of the environment;

a detector signal processor to give an indication of detected emissions for a field of view of the collimated detector;

a correction processor which applies a correction factor for a particular field of view to the indication of detected emissions for that field of view;

a correction factor provider, which provides correction factors accounting for one or more of: the field of view format by applying to the detected emissions for a field of view a weighting which accounts for the degree of sampling of that field of view relative to a normal level of sampling of a field of view; and/or the attenuation between the source location and the detector by changing the correction factor between fields of view to account for the presence of different materials between the source location and the detector; and/or the distance between the source location and the detector by determining the distance between the detector and two or more potential source locations, establishing an actual source location from amongst the potential source locations and using the distance between the actual source location and the detector in the correction factor; and an indicator of the activity derived from the emitted emissions calculated.

* * * * *